(12) United States Patent
Welsh

(10) Patent No.: US 6,416,016 B1
(45) Date of Patent: Jul. 9, 2002

(54) ACTUATOR FOR AN ACTIVE TRANSMISSION MOUNT ISOLATION SYSTEM

(75) Inventor: William A. Welsh, North Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 56 days.

(21) Appl. No.: 09/725,434

(22) Filed: Nov. 29, 2000

Related U.S. Application Data

(60) Provisional application No. 60/233,213, filed on Sep. 15, 2000.

(51) Int. Cl.[7] .............................. B64D 27/00; F16M 1/00
(52) U.S. Cl. ....................... 244/54; 244/60; 244/17.27; 188/378; 267/140.15; 248/638; 248/550
(58) Field of Search .................. 244/17.27, 60, 244/54; 188/378; 267/140.15, 136; 248/638, 550, 557, 562, 566

(56) References Cited

U.S. PATENT DOCUMENTS

| 4,362,281 A | | 12/1982 | Cresap et al. ............. 244/17.27 |
|---|---|---|---|
| 4,819,182 A | | 4/1989 | King et al. ................. 364/508 |
| 5,219,143 A | | 6/1993 | Staple et al. ............... 248/550 |
| 5,228,640 A | * | 7/1993 | Mouille ....................... 188/283 |
| 5,269,489 A | | 12/1993 | West et al. .................. 248/550 |
| 5,310,137 A | | 5/1994 | Yoerkie, Jr. et al. ..... 244/17.11 |
| 5,687,948 A | * | 11/1997 | Whiteford et al. .......... 248/557 |
| 5,845,236 A | * | 12/1998 | Jolly et al. .................. 248/550 |
| 5,896,197 A | * | 4/1999 | Coffin ......................... 356/452 |
| 5,964,327 A | * | 10/1999 | Shih ............................ 188/380 |
| 2001/0017341 A1 | * | 8/2001 | Gennesseaux .............. 248/550 |

FOREIGN PATENT DOCUMENTS

| WO | WO 98/06089 | 2/1998 |
|---|---|---|
| WO | WO 98/16916 | 4/1998 |
| WO | WO 98/30813 | 7/1998 |
| WO | WO 98/39580 | 9/1998 |
| WO | WO 98/44275 | 10/1998 |

* cited by examiner

*Primary Examiner*—J. Woodrow Eldred

(57) ABSTRACT

An actuator is disclosed for an active vibration and noise control system in an aircraft. The actuator is configured to attach a vibrating component, such as a gearbox mounting foot, to an aircraft support structure. The actuator is actuated by the control system to control the transmission of vibratory loads from the gearbox foot. The actuator includes a housing and a mounting member. The housing mounts to the aircraft. The mounting member attaches to the vibrating component within the aircraft. A piston arrangement is attached to the housing and includes a sleeve located within the housing, and a piston slidably disposed within the sleeve. A bearing assembly engages the mounting member with the piston. The bearing assembly includes a first bearing located between the mounting member and an inner bearing member. The first bearing is adapted to transmit axial motions between the mounting member and the piston. A second bearing is located between the inner bearing member and the housing and is adapted to transmit moment and shear loads from the mounting member to the housing. A third bearing is located between the inner bearing member and the piston, and is adapted to permit rotational movement of the inner bearing member relative to the piston.

12 Claims, 4 Drawing Sheets

ACTUATOR FOR AN ACTIVE TRANSMISSION MOUNT ISOLATION SYSTEM

RELATED APPLICATION

This application is related to provisional application entitled "Actuator for an Active Transmission Mount Isolation System", filed Sep. 15, 2000, Ser. No. 60/233,213.

The Government has rights to the invention pursuant to government contract N00019-96-C-2079 awarded by the United States Naval Research Laboratory.

FIELD OF THE INVENTION

The present invention relates to an actuator for an aircraft and, more particularly, to an actively controlled actuator for reducing vibratory transmissions from a gearbox mount to a support structure.

BACKGROUND OF THE INVENTION

Helicopter main rotor lift and rotor driving torque produce reaction forces and moments on the helicopter main gearbox. The aircraft structure which supports the gearbox, e.g., transmission beams, are designed to react these loads and safely and efficiently transmit these primary flight loads to the airframe.

In addition to the primary flight loads, the aircraft is also subjected to vibratory loads originating from the main rotor system and acoustic loads generated by clashing of the main transmission gears. These vibratory and acoustic loads produce vibrations and noise within the aircraft that cause discomfort to the passengers and crew. Low frequency rotor vibrations are a leading cause of maintenance problems in helicopters. Furthermore, as the aircraft reaches its maximum forward speed in level flight, the vibratory loads become very large, thus, producing increasingly high vibrations.

Many attempts have been made over the years to alleviate or reduce these vibratory loads and the resulting vibration and audible noise that develops within the aircraft cabin. A considerable amount of those attempts have been directed toward passive control of the vibrations. Some of the passive solutions have involved changes in rotor blade design to reduce the blade response to the periodic loading it experiences in forward flight. Other passive attempts have been directed toward reducing the transmission of vibratory and acoustic noise into the airframe or from the airframe into the cabin. For example, absorbing blankets have been incorporated between the airframe and the cabin interior for attenuating acoustic energy before it enters the cabin section. Another passive attempt involves the installation of low frequency vibration absorbers around the aircraft that are tuned to the vibration frequency of interest. The tuning is typically at a frequency of NP where N is the number of blades and P is the rotor rotational speed in cycles per second. Tuned absorbers have also been incorporated onto the main transmission support beams to produce a vibration impedance mismatch on and/or near the foot of the transmission.

One example of a passive vibration absorber is disclosed in U.S. Pat. No. 4,362,281 which relates to a pylon mounting system for supporting a helicopter gearbox. The pylon support is attached to the airframe substructure through resilient couplings or mounts. The couplings include elastomeric bushings which provide a soft resilient attachment between the pylon support and the airframe.

The above described passive solutions to reduce noise and vibration transmission have generally proven to be heavy and, consequently, not structurally efficient. These prior attempts also allow excessive motion of the gearbox causing gearbox-to-engine shaft misalignment under quasi-steady flight loads exerted by the main rotor.

There has been some recent attempts at producing active vibration and noise control systems. These systems monitor the status of the aircraft and/or the vibration producing component and attempt to command countermeasures to reduce the noise and vibrations. Active vibration and noise control systems are considered to be better at reducing aircraft vibrations and noise since the systems can be designed to counteract or cancel the vibratory and acoustic loads at or near the structural interface between the transmission and airframe, thus, preventing undesirable loads from entering the airframe.

U.S. Pat. Nos. 4,819,182 and 5,219,143 disclose one attempt at providing an active vibration control system. This system includes a plurality of vibration sensors, e.g., accelerometers, that are located at strategic places throughout the aircraft and provide signals to an adaptive control unit. The control unit provides signals to electro-hydraulic actuators that are located within a series of struts which support the gearbox. The actuators produce controlled forces which attempt to minimize vibration at the sensed locations.

Another active control system is discussed in U.S. Pat. No. 5,588,800. This active control system is mounted within a helicopter rotor blade and includes actuatable flaps on the rotor that are controlled to reduce the blade vortex interaction and/or vibratory loads transmitted to the airframe.

Many of the active control systems that are currently being evaluated or proposed utilize hydraulically operated actuators to provide the counteracting forces for damping the sensed vibratory loads. These actuators include a piston arrangement that is attached to a mounting stub through a ball or universal joint. These types of joints, however, tend to bind under high load, especially high vibratory loads. Also, these actuators incorporate conventional internal seals which are not suitable for vibration and noise. As such, the seals quickly wear out and are not very efficient at attenuating acoustic noise.

Recently, a vibration reduction system was incorporated into an EH-101 aircraft manufactured by Westland Helicopters. The system included a semi-stiff strut mounted in parallel with the piston load to carry the large quasi-steady flight loads. In this design, however, the strut provided a path for undesirable high frequency acoustic vibrations.

A need therefore exists for an improved actuator for use in an active vibration control system to minimize NP vibratory and high frequency acoustic transmissions from a vibrating component into the aircraft airframe.

SUMMARY OF THE INVENTION

The present invention relates to an active vibration and noise control system for controlling the transmission of vibratory loads from a vibrating component. The control system includes an actuator that is designed to attach the vibrating component, such as a gearbox mounting foot, to a support structure. The actuator is actuated by the control system to control the transmission of steady-state and transient loads from the vibrating component.

In one embodiment of the invention, the actuator includes a housing and a mounting member. The housing mounts to the aircraft. The mounting member attaches to the vibrating component within the aircraft. A lap-fit piston arrangement is attached to the housing and includes a sleeve located within the housing, and a piston slidably disposed within the sleeve.

An elastomeric bearing assembly engages the mounting member with the piston. The bearing assembly includes a first bearing located between the mounting member and an inner bearing member. The first bearing is adapted to transmit axial loads between the mounting member and the piston. A second bearing is located between the inner bearing member and the housing and is adapted to transmit moment and shear loads from the mounting member to the housing. A third bearing is located between the inner bearing member and the piston, and is adapted to permit rotational movement of the inner bearing member relative to the piston.

A diaphragm separates the piston from the bearing assembly so as to inhibit hydraulic fluid from contacting the bearing assembly.

The control system includes a processor which receives a plurality of signals representing the vibratory state of the component or airframe and the position state of the actuators. The processor sends signals to a hydraulic actuation system for controlling the movement of the actuators.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Certain terminology is used herein for convenience only and is not to be taken as a limitation on the invention. For example, words such as "upper," "lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
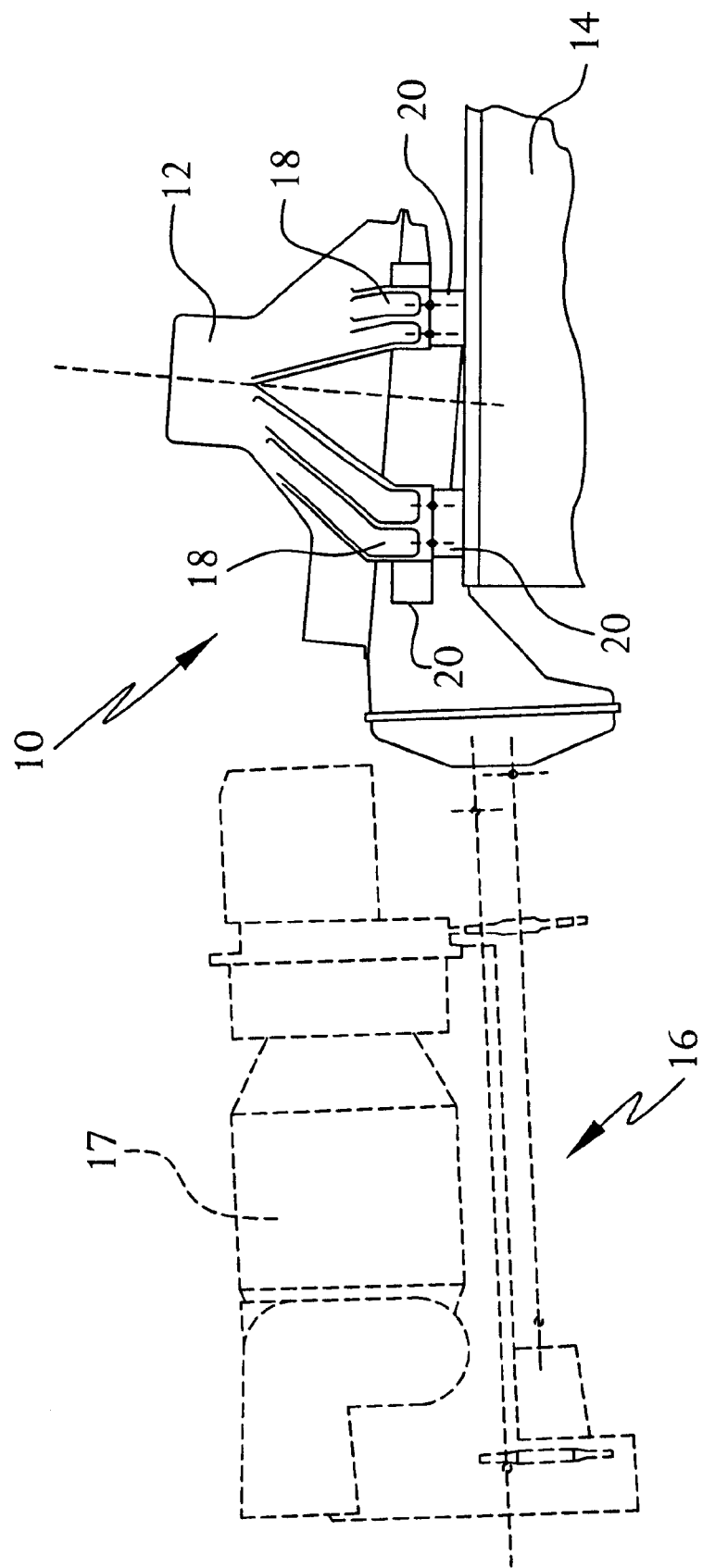
FIG. 1 is a schematic representation of a transmission arrangement incorporating the present invention in a helicopter.

Referring now to the drawings, wherein like reference numerals illustrate corresponding or similar elements throughout the several views, FIG. 1 illustrates a transmission arrangement 10 for a helicopter. The transmission arrangement 10 includes a gearbox 12 which is connected to a helicopter rotor head (not shown). The gearbox 12 is supported by an airframe (generically shown and identified by the reference numeral 14). The gearbox is connected to drive train 16. The gearbox 12 includes a plurality of mounting feet 18 which are typically attached directly to the aircraft structure 14. However, in the present invention, an active transmission mount 20 is located between at least one mounting foot 18 and the airframe structure 14. More preferably, there is an Active Transmission Mount (ATM) 20 located between each mounting foot 18 and the airframe structure 14 (i.e, above or below the mounting foot 18 depending on the mounting configuration). There is also preferably an ATM 20 mounted on the lateral side of each transmission mounting foot 18 (FIG. 2) and attached to the airframe 14.

Figure 2:
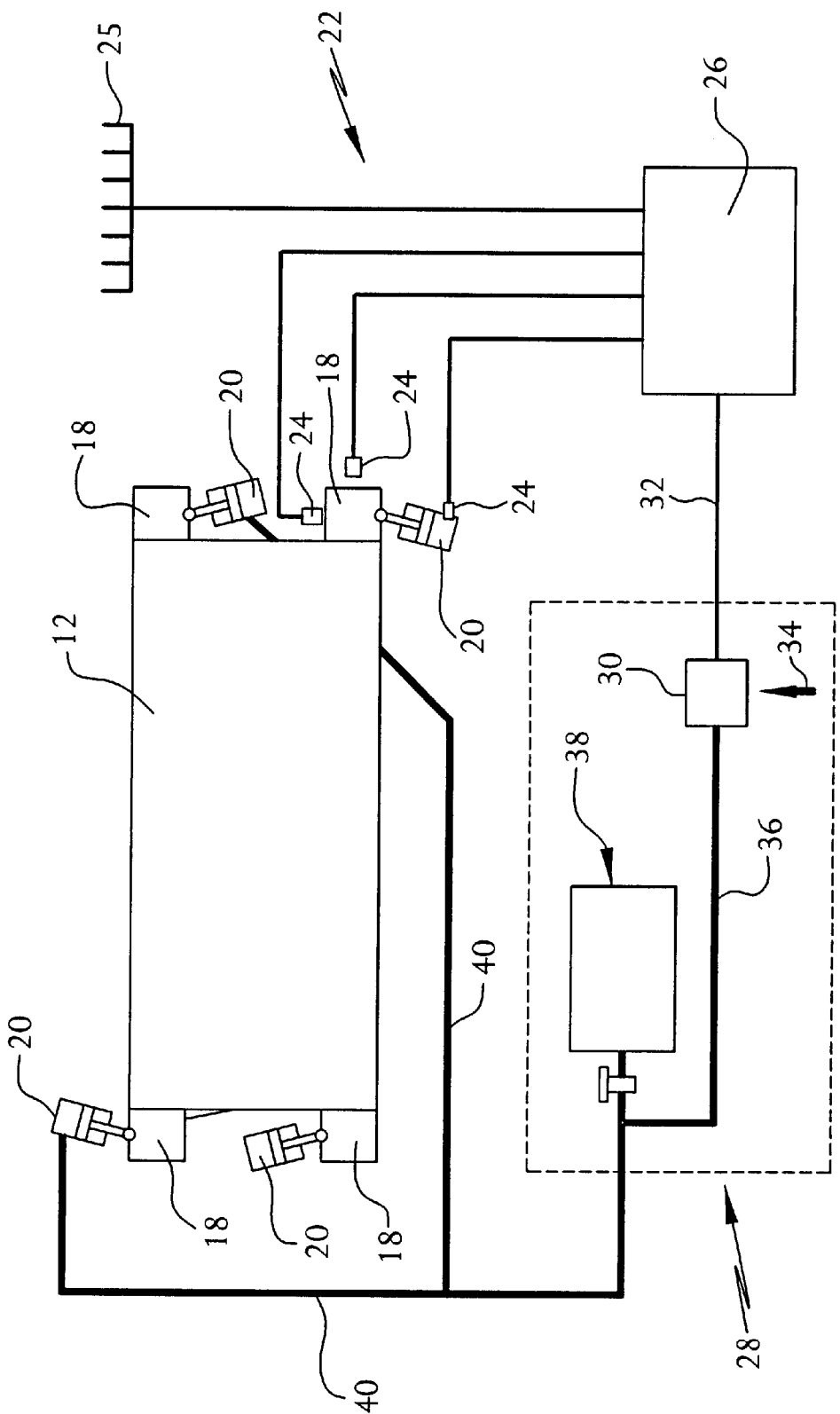
FIG. 2 is a schematic representation of one embodiment of a control system according to the present invention for controlling a plurality of actuators adjacent to a helicopter gearbox.

Referring now to FIG. 2, one embodiment of the present invention is schematically illustrated for controlling the transmission of vibration from the mounting feet 18 of the gearbox 12 to the airframe 14 (not shown in FIG. 2). In this embodiment, which is a view looking down on the gearbox 12, the ATMs 20 are shown positioned on the side of and attached to each mounting foot 18. The ATMs 20 are affixed to and supported by the airframe structure (not shown). As noted above, there is also an ATM 20 located between each mounting foot 18 and the aircraft structure 14 (shown in FIG. 1).

The ATMs 20 are part of an active transmission mount system 22 which is designed to isolate the main gearbox 12 from the airframe 14 so that the acoustic and vibratory loads are minimized or completely attenuated before passage into the fuselage. It is important to note that in order to isolate the gearbox 12 from the airframe, all the applied vibratory loads are isolated so that the gearbox 12, in effect, floats in a dynamic sense with respect to the airframe, but maintains its steady, static position relative to the airframe. The system 22 positions the gearbox 12 by monitoring the sensed signals from a plurality of sensors 24 that are positioned on or adjacent to the mounting feet 18 and the ATMs 20. The sensors 24 preferably sense parameters which can be utilized for determining the vibrational state of the mounting feet 18 (or in the structure adjacent to the mounting feet 18) and for determining the operational state, e.g., actuation position or oscillation mode, of the ATMs 20. In one embodiment of the invention, position sensors 24 monitor the steady position of the feet relative to the airframe. A controller 26 operates to nullify the position off-set. Concomitantly, vibration sensors 25 sense the airframe vibrations and output a corresponding signal. This signal is used by the controller 26 to provide the vibratory flow to the ATM to nullify the vibration. The vibration sensors can be replaced with pressure sensors placed in the fluid lines 40. In this case, the controller 26 nullifies the vibratory pressure, thus reducing the vibratory load passing through the ATM's into the airframe. This results in lower fuselage vibration. The figure illustrates the use of position sensors 24 and accelerometers 25 mounted at strategic locations within the airframe 14 to sense accelerations for feedback to the system for processing.

As discussed above, the sensed signals from the sensors 24 and 25 are provided to an electronic controller 26, such as a signal processor or computer. The controller 26 determines the position and loading being transmitted from each mounting foot 18. The controller 26 then determines a desired operational state for each ATM 20 as a function of one or more of the sensed signals 24 and 25.

The controller 26 sends a signal to an actuation system 28 commanding the actuation system to actuate the ATMs 20 according to the desired operational state. In one embodiment of the invention, the actuation system 28 is a hydraulic actuation system and the ATMs 20 are hydraulic actuators. A hydraulic actuation system is preferred since it permits high frequency and high pressure control of the actuators to accommodate the frequencies and high loads typically experienced in a helicopter aircraft system.

The hydraulic actuation system 28 supplies hydraulic fluid under pressure to each hydraulic actuator 20 to control the actuator so that it moves in the desired direction and at the desired frequency to counteract the sensed vibrations. In the illustrated embodiment, the hydraulic actuation system 28 preferably includes one or more electro-hydraulic valves 30 which are each electrically connected to the controller 26 via a control line 32. The control line 32 is used to supply current to the valve 30. The valve 30 controls flow of high pressure hydraulic fluid from a fluid source (not shown) to the ATM actuators 20. The supply flow into the valve 30 is indicated by the numeral 34 and the flow to the ATM actuators 20 is indicated by the numeral 36.

The actuation system 28 also preferably includes a tuned acoustic stub assembly 38. (Note: for the sake of simplicity, the fluid lines 40 are shown going to only two of the actuators.) The tuned stubs introduce softness into the hydraulic system at pre-selected frequencies to allow the system to attenuate high frequency (e.g., 778 Hz, 1556 Hz) and low amplitude (e.g., 1/1000 inch) acoustic vibrations that are otherwise transmitted by the gearbox feet 18 into the ATM, thus, causing high frequency pressure in the fluid lines. It is also contemplated that an accumulator can be substituted for the tuned stubs to assist in pressurizing the various ATM actuators and adding softness into the system.

The ATM actuator 20 according to the present invention isolates the gearbox from the airframe and, thus, controls the transmittance of vibratory loads. The ATM actuator 20 is designed to accommodate the large quasi-steady flight loads that are transmitted through the mounting feet 18 to the airframe. The magnitude of these loads can be quite high. For example, in a Sikorsky Aircraft Corporation S-76 aircraft, the quasi-steady flight loads have a magnitude of about 8000 lbs. (which is the approximate weight of the aircraft) on each actuator 20. This applied quasi-steady flight load can change in magnitude and direction very quickly depending on pilot inputs into the aircraft. As such, the ATM actuator 20 must be designed to accommodate such loads while limiting gearbox motions to only about ±0.050 inches in order to avoid excessive misalignment of the engine transmission shaft. The actuator according to the present invention is also designed to prevent the transmission to the airframe of small vibratory loads (e.g., 500 lbs. between about 16 Hz and about 50 Hz) and even smaller acoustic loads (30 lbs. between 600 Hz and 3 kHz) which are the vibratory and acoustic loads which cause the vibration and acoustic noise that are the most bothersome to the passengers and crew within the aircraft.

The actuator 20 is designed to passively isolate the vibratory and acoustic loads which are applied perpendicular to the longitudinal axis of the actuator. This is achieved by configuring the actuators so that the off-axis (perpendicularly applied) loads are forced to pass through the soft axis of the actuator's built-in elastomeric element (discussed in greater detail hereinbelow). The loads that are applied along the actuator longitudinal axis are transmitted into the hydraulic column. This causes pressure fluctuations which would otherwise be transmitted into the airframe causing noise and vibration. However, the pressure is altered by the electro-hydraulic valve 30 (shown in FIG. 2) to minimize either vibratory pressure, thereby reducing the transfer of low frequency vibrations into the airframe. High frequency pressures that would cause noise in the aircraft are attenuated by the tuned acoustic stubs 38.

Figure 3:
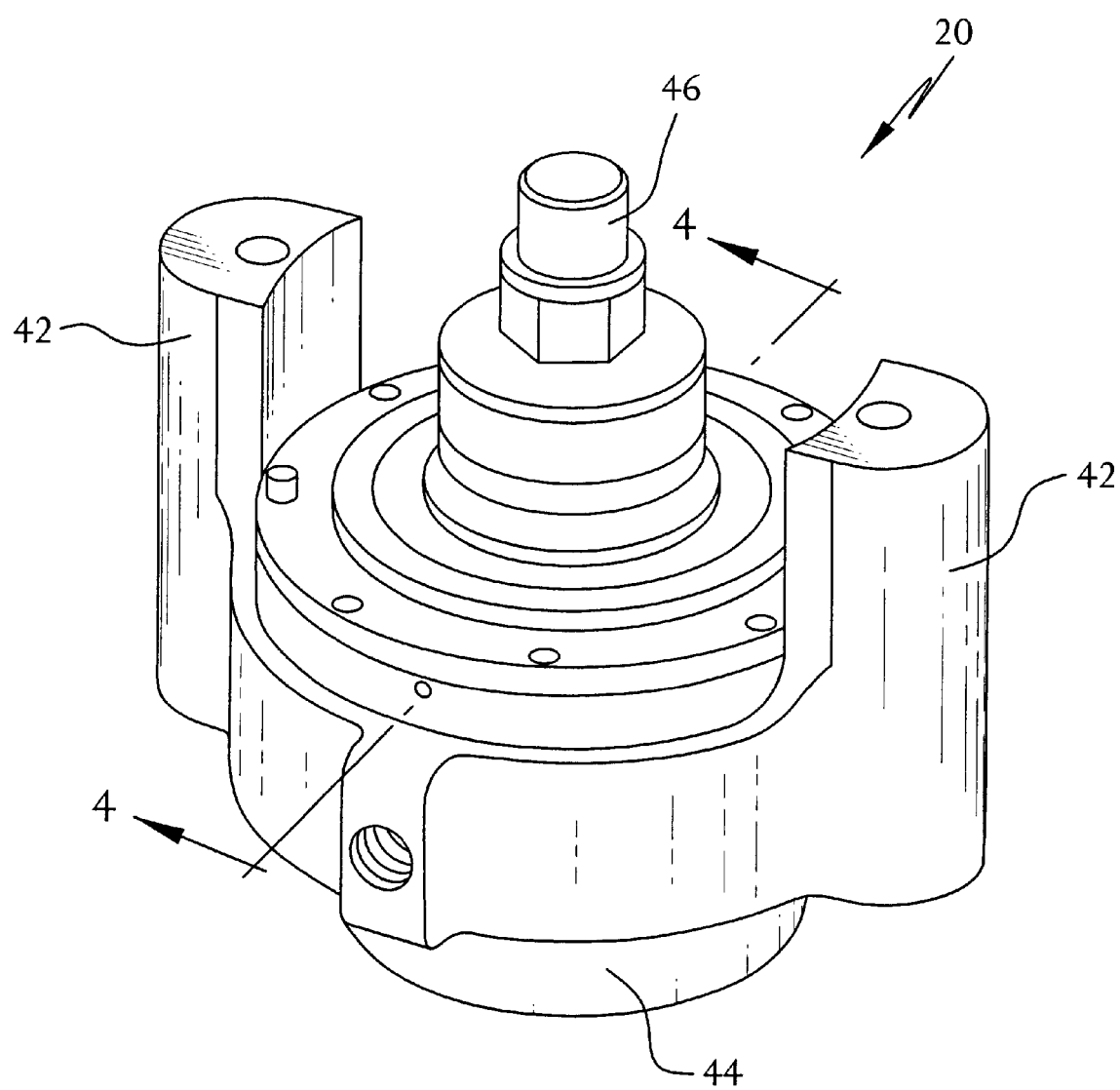
FIG. 3 is an isometric view of one embodiment of an actuator made in accordance with the present invention.
Figure 4:
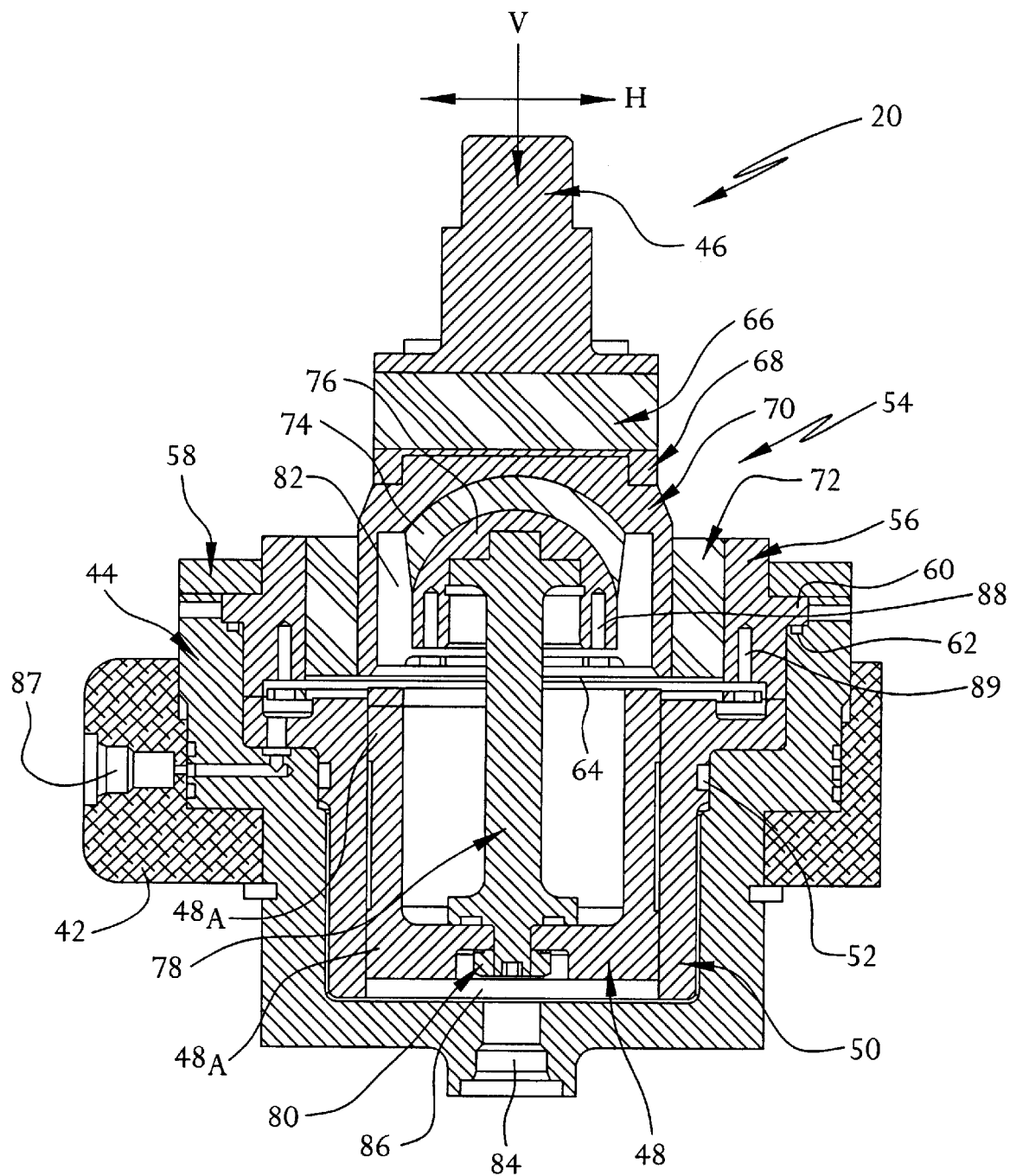
FIG. 4 is a cross-sectional view of the actuator taken along lines 4—4 in FIG. 3.

Referring now to FIGS. 3 and 4, one preferred hydraulic ATM actuator 20 is shown which meets these design requirements. The actuator 20 is a lap-fit type actuator and includes a housing 44 with a mounting flange 42 for attaching the actuator 20 to the airframe and/or a support structure. The actuator 20 also includes a mounting member 46, such as a threaded stud, that is configured to attach to the mounting foot (not shown). Other methods of attachment may be used with the present actuator design.

The mounting member 46 is attached to a piston 48 which is adapted to slide within a sleeve 50. As discussed above, the actuator 20 is preferably a lap-fit type actuator. Lap-fit actuators are well known in the art. These actuators do not include any sliding seals. Instead, the lap-fit actuator is designed with extremely close tolerances (i.e., millionths of an inch) between the piston and the outer sleeve. As such, there is a close sliding engagement between the outer surface of the piston 48 and the cylindrical inner surface of the sleeve 50. Seals have two key drawbacks. First, they eventually wear out under the action of continuous vibration. Second, the seals provide an undesirable path for vibratory and acoustic loads in the housing 44 and, thus, the airframe 14. Loads transmitted through this path cannot be easily controlled by the valve 30 or attenuated by the tuned stub 38. Those skilled in the art of actuators are well aware of the design specifics of a lap-fit type piston arrangement and, therefore, no further details are needed. Moog Inc. is one of several manufacturers currently making lap-fit type actuators.

Since manufacturing a piston 48 to meet the tolerances needed for a lap-fit is difficult, the outer surface of the piston 48 in the present embodiment is formed with two raised annular surfaces $48_A$ which provide the close sliding engagement between the piston 48 and the sleeve 50. The sleeve 50 is located within a recess of the housing 44. A static seal 52, such as an O-ring seal is located between the sleeve 50 and the housing 44 to prevent hydraulic fluid from passing between the two.

As discussed above, the present invention is designed to isolate the vibratory and acoustic loads from being transmitted from the gearbox feet 18 to the airframe. This is accomplished by canceling or attenuating the vibratory or acoustic loads that would otherwise pass into the airframe 14 by either actively oscillating the flow into the actuator 20 (or more exactly the hydraulic space 86) using the valve 30, or passively attenuating acoustic pressure through the added softness of the tuned acoustic stubs 38. However, quasi-steady loads which change depending upon the pilot inputs and which approximately represent the aircraft weight amplified by the maneuver the aircraft is undergoing, must be transmitted to the airframe 14.

Hence, the actuator 20 must be designed to accommodate these quasi-steady loads. Referring to FIG. 4, the load applied by the gearbox foot 18 to the stud 46 has a vertical quasi-steady state load V which is subject to a horizontal motion H. The vertical load V on a typical S-76 aircraft manufactured by the Sikorsky Aircraft Corporation is approximately 8000 lbs and the horizontal motion H is approximately ±0.050 inches and can be either steady or vibratory in nature. The maximum horizontal load is approximately 1500 lbs. There is also some vertical motion that occurs due to loading on the transmission foot. This vertical motion is approximately 0.075 inches from the steady state loading and 0.050 inches from the vibratory loading. These motions result in a shear loading and a moment loading on the actuator 20. As discussed above, the present invention includes a lap-fit type piston which cannot withstand side loads higher than about 50 pounds. As such, a lap-fit type piston could not be used in a conventional actuator to react these applied loads. The present invention, however, utilizes a novel bearing assembly 54 to react the applied loads. The bearing assembly 54 is described in more detail below.

The bearing assembly 54 is located on top of the sleeve 50 and includes an outer bearing member 56 which contacts an upper edge of the sleeve 50. The outer bearing member 56 is attached to the housing 44 through any conventional method. In the illustrated embodiment, a clamping ring 58 is used to attach the outer bearing member 56 to the housing 44. More particularly, the clamping ring 58 contacts a flange 60 on the outer bearing member 56. The flange 60, in turn, presses against a seal 62 that is adjacent to the housing 44. The clamping ring 58 is attached to the housing 44 with conventional fasteners (not shown) and, thus, locks the bearing assembly 54 and sleeve 50 to the housing 44.

In one embodiment of the invention, the housing 44 and clamping ring 58 are made from stainless steel material, although aluminum is preferable. The mounting member 42 is preferably made from aluminum material. The piston 48 and sleeve 50 are preferably made from stainless steel.

A diaphragm 64 is attached to a lower face of the outer bearing member 56 and separates the bearing assembly 54 from the sleeve 50 and the piston 48. As such, slightly pressurized hydraulic fluid which leaks past the piston 48 is substantially prevented from passing from the sleeve/piston side of the diaphragm 64 to the bearing assembly side. The diaphragm 64 is preferably made from nitral rubber. This is done because hydraulic fluids can damage the elastomeric material of the outer bearing member 56. The space between the diaphragm 64 and the other components of the outer bearing member 56 is preferably filled with polybutene. This material does not react unfavorably with the elastomer of the outer bearing member 56 when in direct contact. The material prevents excessive deformation of the diaphragm 64 when subjected to the low pressure caused by leakage of hydraulic fluid past the lap-fit piston 48. The diaphragm 64 is preferably attached on its inner diameter to the bearing assembly 54 at point 88 and/or to the piston rod 78. The diaphragm 64 is preferably attached at its outer diameter to the outer bearing member 60 at point 89.

The bearing assembly 54 is designed to react the loads that are applied to the actuator 20 from the gearbox foot 18. The bearing assembly 54 includes three resilient bearings to react or isolate the applied loads to effectively eliminate any side loading on the piston 48 and sleeve 50. Referring to FIG. 4, a first or thrust bearing 66 is mounted below the stud 46 and is preferably an elastomeric bearing. Elastomeric bearings are well known in the art and generally comprise alternating layers of elastomer and nonresilient shims. The number of elastomer layers and shims is not limited to the number shown in the figures but, instead, would be determined by the applied loads. The thrust bearing 66 is designed to be stiff (i.e., rigid) in the axial (vertical) direction and soft (i.e., flexible) in the lateral (horizontal) direction. For a 12,000 lb gross weight helicopter, the axial stiffness of the thrust bearing 66 is preferably greater than about 900,000 lbf/in, and the lateral stiffness is preferably less than about 2000 lbf/in. The thrust bearing 66 is preferably substantially planar in shape. The thrust bearing 66 is preferably located between and attached to a mounting member formed on the stub 46 and a thrust mounting plate 68. The attachment of the bearing is through any conventional means, such as adhesive.

The thrust plate 68 is attached to or formed on an upper end of an inner bearing member or support 70. The inner bearing member 70 is preferably substantially cylindrical in shape with a longitudinal axis that lies substantially in line with a longitudinal axis of the piston 48. At least a portion of the inner bearing member 70 is located within the outer bearing member 56. A radial journal bearing 72 is located between the inner and outer bearing members 56, 70. The radial journal bearing 72 is preferably an elastomeric bearing that is cylindrical in shape. The radial journal bearing 72 is preferably stiff in the radial direction and soft axially. For a 12,000 lb. gross weight helicopter, the radial journal bearing preferably has a radial stiffness greater than about 300,000 lbf/in and an axial stiffness less than about 4000 lbf/in.

A spherical bearing 74 is located within and engages with an inner spherical surface on the inner bearing member 70. The spherical bearing 74 is attached to a spherical bearing support 76. The spherical bearing 74 is preferably an elastomeric bearing with a center line that lies substantially in line with the longitudinal axis of the piston 48. The spherical bearing 74 is preferably stiff axially and soft tangentially. For a 12,000 lb. gross weight helicopter, the spherical bearing preferably has an axial stiffness greater than about 500,000 lbf/in, and a tangential stiffness less than about 2320 in-lbf/deg. The center of rotation of the spherical bearing 74 is preferably close to the center of rotation of the radial journal bearing 72. In this way, any small angular motions of the inner bearing member 70 does not produce large moments or radial loads on the spherical bearing support 76.

The cumulative bearing stiffness (without hydraulic fluid) assures isolation of vibratory and acoustic motions in the axial direction from being transmitted into the mounting flange 42 and, thus, into the airframe 14. For a 12,000 lb. helicopter, the cumulative bearing stiffness in the horizontal and vertical directions is preferably less than about 20,000 lbf/in. The cumulative axial stiffness of the thrust bearing 66 and the spherical bearing 74 must be as high as possible, preferably, greater than 100,000 lbf/in, to preclude excessive compression of these members under vibratory load. This compression causes unwanted flow demands upon the hydraulic valve 30 and the supply 34.

The spherical bearing support 76 is engaged with the piston 48 through a piston rod or stinger 78. The piston rod 78 is preferably made from a metallic material, such as steel and is attached to the spherical bearing support 76 and piston 48 through any conventional means known to those skilled in the art, such as a bolted connection 80. In one embodiment of the invention, the piston rod 78 is designed to have some lateral flexibility (i.e., reduced lateral stiffness) to permit bending and, thus, further eliminate any residual side loads from being transmitted to the piston 48 from the bearing assembly 54.

The preferred bearing assembly 54 provides a novel mechanism for transferring and reacting applied gearbox foot 18 loads with a lap-fit type actuator. As stated above, the applied loads result in moment and shear loads being applied to the stud 46. The design of the bearing assembly 54 is such that axial loads are transmitted through the thrust bearing 66 and spherical bearing 74 directly to the piston 48. The lateral loads caused by the lateral motions are reduced by radial shearing of the thrust bearing 66. The residual loads are reacted by the radial journal bearing 72 which prevents the inner bearing member 70 from radial motion and cocking with respect to the outer bearing member 56. Any residual cocking of the inner bearing member 70 is accommodated by the spherical bearing 76 which is very soft circumferentially. As a consequence, only small angular moments are transferred through the spherical bearing 74 to the spherical bearing support 76 and, thus, to the piston rod 78. The lower end of the piston rod 78 reacts these small moments as a small radial force. A slip surface (not shown) can be formed at the lower end of the piston rod 78 to eliminate this small side load if desired or, instead, the piston rod 78 can be designed to bend.

The present invention acts as an isolation system for preventing vibration and noise from transferring from the gearbox feet 18 to the airframe. The active transmission mount system 22 applies a quasi-steady pressure to the actuator 20 to react the applied vertical steady state loads. The system then controls the flow within the actuator 20 to relieve pressure when a vibratory load pushes on the actuator 20 and increase the flow when the vibratory load pulls on the actuator. Hence, the actuator 20 is operated by removing and supplying a sufficient amount of hydraulic fluid against the head of the piston 48 to translate the piston in substantially the same direction and at substantially the same frequency as the applied vibratory loading. As a result, vibratory pressure is minimized and, thus, the actuator 20 does not transmit any vibration or noise related loads to the airframe structure. The applied flows are controlled by the controller 26 and the hydraulic actuation system 28.

The pressurized hydraulic fluid is channeled through an inlet 84 to a chamber 86 and against the head of the piston 48. Since a lap-fit piston does not include seals, pressurization is obtained by a close-fit sliding interface between the piston 48 and the sleeve 50. However, even with this close fit, hydraulic fluid will escape between the piston 48 and the sleeve 50 as the piston 48 moves relative to the sleeve 50. To account for the leakage, the present invention includes a outlet passage 87 which channels the low pressure leaking hydraulic fluid back to the hydraulic actuation system 28.

The present invention provides a novel actuator and system for controlling vibrational and acoustic noise transmission from a helicopter gearbox footing to the airframe 14. While the invention is illustrated and described as being used for controlling vibrational transmission from a gearbox foot to the airframe 14, it is not limited to that embodiment. On the contrary, the present invention can be used to address vibrational transmissions from a variety of other components in various types of machines and aircraft.

An ATM actuator 20 and ATM system 10 were tested on the gearbox footing of a Sikorsky Aircraft Corporation S-76 aircraft. Reductions of about 13 dB in cabin noise and about 20 db in vibrations have be achieved using the present invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An actuator for an active vibration and noise control system in an aircraft, the actuator for attaching to a vibrating component within the aircraft, the control system adapted to actuate the actuator to isolate vibratory load transmissions, the actuator comprising:

a housing for mounting to the aircraft, the housing having a recess formed in it;

a mounting member for attaching to the vibrating component;

a lap-fit piston arrangement attached to the housing, the lap-fit piston arrangement including a piston slidably disposed within the housing;

a bearing assembly engaged with the mounting member and the piston, the bearing assembly adapted to transmit axial motions between the mounting member and the piston, the bearing assembly also adapted to isolate moment and shear loads from the mounting member to the housing, and adapted to permit rotational movement of the inner bearing member relative to the piston.

2. An actuator according to claim 1 wherein the bearing assembly includes:

an inner bearing member, a first bearing located between the mounting member and the inner bearing member, the first bearing transmitting the axial motions between the mounting member and the piston, a second bearing located between the inner bearing member and the housing, the second bearing transmitting the moment and shear loads from the mounting member to the housing, and a third bearing located between the inner bearing member and the piston, the third bearing permitting the rotational movement of the inner bearing member relative to the piston.

3. An actuator according to claim 2 wherein the bearings are elastomeric bearings, and wherein the first bearing is a thrust bearing and the second bearing is a radial journal bearing and the third bearing is a spherical bearing.

4. An actuator according to claim 2 further comprising a piston rod attached at one end to the piston and at the other end to a bearing support, and wherein the third bearing is located between the inner bearing member and the bearing support.

5. An actuator according to claim 1 wherein the housing includes at least one inlet adapted to receive a flow of hydraulic fluid, the inlet communicating with a chamber located adjacent to the piston.

6. An actuator according to claim 1 wherein the active vibration and noise control system includes a fluid supply and wherein the housing includes an inlet which is connected to the fluid supply.

7. An actuator for use in an active control system for controlling transmission of loads from a gearbox foot to an aircraft airframe in an active control system, the actuator comprising:

a housing for mounting to an airframe component, the housing having a recess;

a mounting member for attaching to a gearbox foot;

a piston slidably disposed within the housing; and a bearing assembly engaged with the mounting member and the piston, the bearing assembly including
an inner bearing member,
a thrust bearing located between the mounting member and the inner bearing member, the thrust bearing adapted to transmit axial motions between the mounting member and the piston, a radial journal bearing located between the inner bearing member and the housing, the radial journal bearing adapted to transmit moment and shear loads from the mounting member to the housing, and a spherical bearing located between the inner bearing member and the piston, the spherical bearing adapted to permit limited transmission of the inner bearing member relative to the piston.

8. An actuator according to claim 7 further comprising a piston rod attached at one end to the piston and at the other end to a bearing support, and wherein the third bearing is located between the inner bearing member and the bearing support.

9. An actuator according to claim 7 wherein the housing includes at least one inlet adapted to receive a flow of hydraulic fluid, the inlet communicating with a chamber located adjacent to the piston.

10. An actuator according to claim 7 wherein the active vibration and noise control system includes a fluid supply and wherein the housing includes an inlet which is connected to the fluid supply.

11. An actuator in an active control system for controlling transmission of vibratory loads from a vibrating component to a support structure, the actuator comprising:

a housing for mounting to a support structure, the housing having a recess;

a mounting member for attaching to a component subject to vibratory loads;

a lap-fit piston arrangement attached to the housing, the lap-fit piston arrangement including
a piston slidably disposed within the housing, and
a piston rod attached to the piston; and a bearing assembly attached to the mounting member and the piston rod, the bearing assembly including
an inner bearing member,
an elastomeric thrust bearing located between the mounting member and the inner bearing member, the thrust bearing adapted to transmit axial motions between the mounting member and the piston,
an radial elastomeric journal bearing located between the inner bearing member and the housing, the radial journal bearing adapted to transmit moment and shear loads from the mounting member to the housing, and
an spherical elastomeric bearing located between the inner bearing member and the piston, the spherical bearing adapted to permit limited rotation of the inner bearing member relative to the piston.

12. An actuator according to claim 11 wherein the housing includes at least one inlet adapted to receive a flow of hydraulic fluid, the inlet communicating with a chamber located adjacent to the piston.

* * * * *